US010243709B2

(12) United States Patent
Hwang et al.

(10) Patent No.: US 10,243,709 B2
(45) Date of Patent: *Mar. 26, 2019

(54) METHOD AND DEVICE FOR DETERMINING MUTUAL INFORMATION (71) Applicant: Intel IP Corporation, Santa Clara, CA (US)

(72) Inventors: Yeong-Sun Hwang, Oberhaching (DE); Ismael Gutierrez, Dresden (DE); Andreas Bury, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 14/957,165

(22) Filed: Dec. 2, 2015

(65) Prior Publication Data
US 2016/0173253 A1 Jun. 16, 2016

(30) Foreign Application Priority Data

Dec. 15, 2014 (DE) ........................ 10 2014 118 600

(51) Int. Cl.
H04L 5/00 (2006.01)
H04B 7/0456 (2017.01)
H04L 1/20 (2006.01)

(52) U.S. Cl.
CPC ......... *H04L 5/0048* (2013.01); *H04B 7/0456* (2013.01); *H04L 1/20* (2013.01); *H04L 5/006* (2013.01); *H04L 5/0023* (2013.01)

(58) Field of Classification Search
CPC ..... H04L 5/0048; H04L 5/006; H04L 5/0023; H04B 7/0456
See application file for complete search history.

(56) References Cited

U.S. PATENT DOCUMENTS

| 9,544,121 | B2* | 1/2017 | Balraj | H04L 1/0003 |
| 2011/0261868 | A1 | 10/2011 | Bachl et al. | |
| 2013/0195023 | A1 | 8/2013 | Vaisanen et al. | |
| 2014/0294130 | A1* | 10/2014 | Umeda | H04L 25/022 375/349 |
| 2015/0092583 | A1* | 4/2015 | Balraj | H04L 1/0003 370/252 |

FOREIGN PATENT DOCUMENTS

| CN | 101053269 A | 10/2007 |
| CN | 101663847 A | 3/2010 |
| CN | 103124413 A | 5/2013 |
| EP | 2547022 A1 | 1/2013 |
| KR | 20090127016 A | 12/2009 |

OTHER PUBLICATIONS

Office Action dated Dec. 8, 2016 for Taiwanese Patent Application No. 104137176.
Office Action dated Apr. 3, 2018 for Chinese Application No. 201510760218.1.

* cited by examiner

*Primary Examiner* — Melvin C Marcelo
(74) *Attorney, Agent, or Firm* — Schiff Hardin LLP (57) ABSTRACT A method (200) of determining mutual information of a composite receive signal, the composite receive signal comprising a reference signal and a data signal, includes the following acts: estimating (201) a base metric of the composite receive signal based on the reference signal, the base metric being indicative of a channel quality; and determining (202) the mutual information based on the base metric and the data signal.

26 Claims, 6 Drawing Sheets

METHOD AND DEVICE FOR DETERMINING MUTUAL INFORMATION

TECHNICAL FIELD

Embodiments described herein generally relate to methods and devices for determining mutual information based on a composite receive signal comprising a reference signal and a data signal. In particular, embodiments described herein relate to data-aided adaptive mutual information estimation methods and receiver circuits applying such methods, in particular wireless cellular receiver circuits.

BACKGROUND

Figure 1:
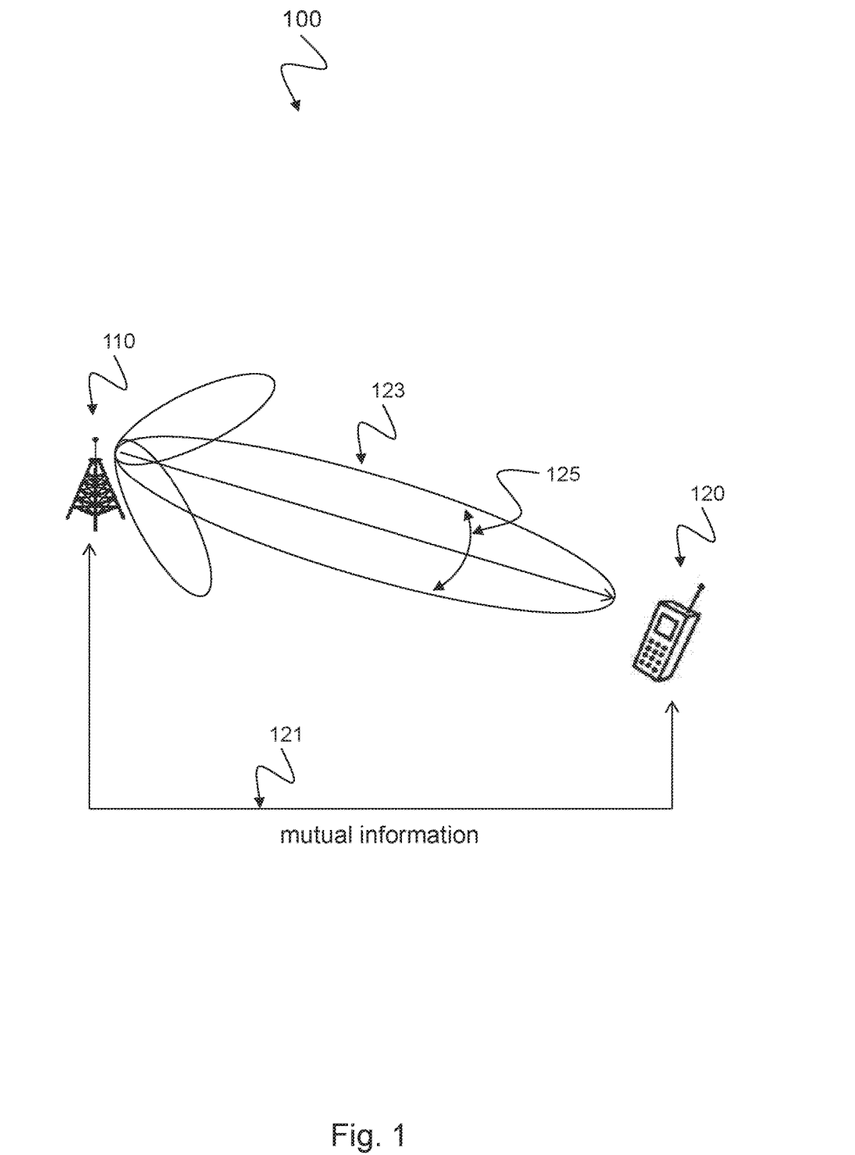
FIG. 1 is a schematic diagram of a wireless communication network 100 using mutual information 121 to represent the channel quality.

Wireless communication networks 100 may use mutual information (MI) 121 as shown in FIG. 1 to represent the channel quality or the corresponding reception performance. An estimate of mutual information between the transmitted signal at a transmitter 110, e.g. a base station and the received signal at a receiver 120, e.g. a mobile terminal of a communication link may be based on limited observations at the receiver 120. As such, MI estimates 121 are widely used for a variety of applications. One such application is link monitoring, whereby MI estimates 121 are used to help the receiver 120 decide in choosing appropriate transmitter 110 to connect with. Another application is link adaptation, whereby MI estimates 121 are used to derive signal parameters such as preferred rank, pre-coding, modulation order, channel code rate, etc., that are fed back to the transmitter 110 and are used to modify aspects of the transmit signal, e.g. direction of the transmitted signal 123 and spatial coverage of the signal 125, for more reliable communication.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the concept of the present disclosure. The following detailed description, therefore, is not to be taken in a limiting sense, and the concept of the present disclosure is defined by the appended claims.

The following terms, abbreviations and notations are used herein:
MI: Mutual Information,
ML: Maximum Likelihood,
MMSE: Minimum Mean Square Error,
SNR: Signal to Noise Ratio,
SINR: Signal to Interference and Noise Ratio,
LTE: Long Term Evolution,
RF: Radio Frequency,
UE: User Equipment,
MIMO: Multiple-Input Multiple-Output,
OFDMA: Orthogonal Frequency Division Multiple Access
SM: Spatial Multiplexing,
LLR: Log-Likelihood Ratio,
PDSCH: Physical Downlink Shared Channel,
RB: Resource Block, The methods and devices described herein may be based on determining mutual information. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, for instance communication networks based on OFDMA such as LTE or WiFi and in particular multiple-input multiple-output (MIMO) communication systems. In particular, the basic idea can be applied to any multiplexing/multiple access schemes, and is not limited to OFDM/OFDMA. The methods and devices described below may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein may be based on reference signals, data signals and channel estimates. Herein, reference signal (RS) denotes pre-defined non-data signals of known pattern and includes pilots, preambles, mid-ambles, and post-ambles. To facilitate the estimation of the channel characteristics, mobile standards such as LTE may use reference signals to estimate the channel at given locations within a unit of time and frequency interval, e.g. a subframe. Through interpolation it may be possible to estimate the channel across an arbitrary number of subframes. RS may be transmitted in each physical antenna port. It may be used for both demodulation and measurement purpose. Its pattern design may ensure channel estimation accuracy. Reference signals, in particular CRS may be used for cell search and initial acquisition, downlink channel estimation for coherent demodulation/detection at the UE and downlink channel quality measurements.

The methods and devices described herein may be based on mutual information and channel estimates. Observations for MI estimation can include data and non-data signals. MI estimation based on data can faithfully reflect the impact of channel, interference, and receiver on the data reception performance, but it has the obvious limitation of being applicable only when data is available. For many applications that need MI estimates regardless of the presence of data, observations are chosen from available non-data reference signals of known pattern. Herein, MI estimation/estimate based on data signals is referred to as data MI estimation/estimate and MI estimation/estimate based on reference signals is referred to as reference MI estimation/estimate.

The methods and devices described herein may be based on composite receive signals including a reference signal and a data signal. Reference MI estimation can be performed whenever reference signals are present, but its accuracy may not be consistent across the range of possible channel characteristics, interference conditions, and receiver types. This is because, first, reference signals are sparse in frequency and in time by design due to spectral efficiency reasons. Thus the ranges of resolvable channel frequency-selectivity and time-selectivity are inherently limited. Second, reference signals may undergo different interference condition than that of data signals. For instance, transmitters may employ distinct reference signals with non-overlapping frequency-time positions. If interfering transmitters are unloaded or partially loaded, the interference condition at some or all reference signals from the communicating transmitter may be different from the condition at data signals. Reference MI estimates in this case can be too optimistic. Third, received reference signals typically undergo demodulation process that is different from the data demodulation. Thus the observations do not depend on the choice of data receiver, implying that a distinct reference MI estimator needs be constructed for each receiver type supported, such as minimum mean-square error (MMSE) detector or maximum likelihood (ML) detector.

The methods and devices described herein may be applied in MIMO systems. Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

The methods and devices described herein may be based on MIMO schemes, transmission diversity, spatial multiplexing, precoding matrices, link adaptation, feedback mechanism and channel quality indication as described in the following. In the Long Term Evolution (LTE) the feedback for channel adaptation may include three values which may be the Channel Quality Indicator (CQI), the Rank Indicator (RI) and the Pre-coding Matrix Indicator (PMI). By the CQI the transmitter may select one of 15 modulation alphabet and code rate combinations for transmission. The RI may inform the transmitter about the number of useful spatial transmission layers for the current MIMO channel, and the PMI may signal the codebook index of the preferred pre-coding matrix.

MIMO techniques may be integrated into the LTE physical layer. The MIMO schemes standardized for LTE may include transmit diversity schemes as well as spatial multiplexing modes. Within the MIMO spatial multiplexing modes of LTE DL, a maximum of four spatial layers may be used but only two independent codewords may be transmitted. A codeword may be a block of encoded bits that may be transmitted in one Transmission Time Interval (TTI). The eNB (eNodeB) can use feedback from the UE in order to select a MIMO pre-coding matrix within a predefined set ("closed-loop" MIMO), or to rely on "open-loop" MIMO, where a fixed pre-coding matrix may be applied. The pre-coding matrix can be seen as a set of adaptive complex weights applied at the eNB antenna ports aimed to improve the MIMO post-processing signal to noise ratio in the UE.

Even with open-loop MIMO, or with a transmission diversity scheme, feedback from the UE may be needed to perform Link Adaptation (LA). LA may be the process by which the eNB, assisted by the UE, may select the modulation and coding scheme (MCS) that will be used for DL transmission in the next TTI. LA may aim to adapt the information data rate for each UE to its current channel capacity. In LTE the MCS may be constant over all the allocated frequency resources of a particular user, but if two codewords may be transmitted simultaneously using MIMO spatial multiplexing, then each codeword can use an independent MCS. The UE may measure the DL received signal quality using the reference signals (pilots) and may report to the eNB the preferred MCS for each codeword. This report may be signaled using a Channel Quality Indicator (CQI) index, and may summarize the measured signal quality and also the UE capabilities since the UE is signaling a MCS such that, given current channel conditions, the next codeword may be received with a Block Error Rate (BLER) below 10%. Therefore, a suitable set of BLER versus channel quality thresholds should be made available to the UE in order to produce meaningful CQI feedbacks. Link abstraction models, e.g. representations using mutual information metrics as described above to describe the channel capacity, can be used to obtain the set of valid Look Up Tables (LUT) from which CQIs can be reported.

Figure 2:
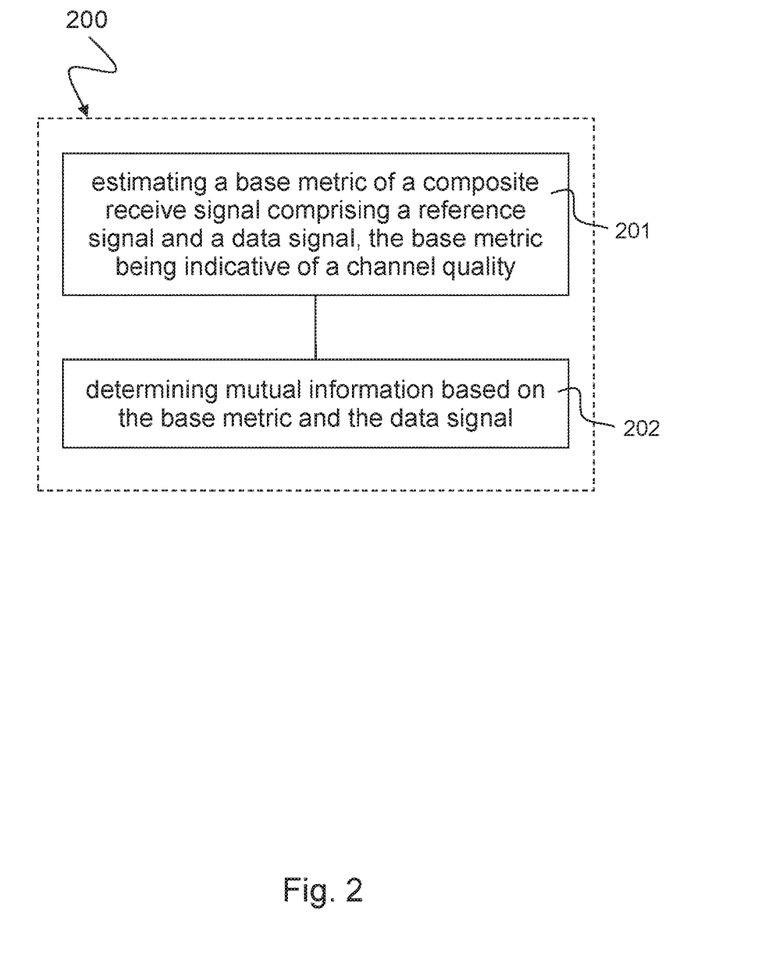
FIG. 2 is a schematic diagram of a method 200 in accordance with the disclosure for determining mutual information of a composite receive signal including a reference signal and a data signal.

FIG. 2 is a schematic diagram of a method 200 in accordance with the disclosure of determining mutual information of a composite receive signal including a reference signal and a data signal.

The method 200 includes an act of estimating 201 a base metric of the composite receive signal based on the reference signal, the base metric being indicative of a channel quality. The method 200 includes an act of determining 202 the mutual information based on the base metric and the data signal.

The method 200 may further include an act of estimating data-related mutual information based on the data signal and an act of determining the mutual information based on the base metric and the data-related mutual information. The method 200 may further include an act of determining a first mapping of the base metric to mutual information based on the reference signal and an act of determining the mutual information by adjusting the first mapping based on the data-related mutual information. The method 200 may further include an act of determining a second mapping of the base metric to data-related mutual information. Adjusting the first mapping may comprise updating the first mapping by using the second mapping. The method 200 may further include an act of determining a first set of base metrics for at least one of a first time or frequency granularity based on the reference signal and an act of determining the first mapping of the base metric to mutual information based on the first set of base metrics.

The method 200 may further include an act of determining a second set of base metrics for at least one of a second time or frequency granularity based on the reference signal and an act of determining the second mapping of the base metric to data-related mutual information based on the second set of base metrics. The at least one of the second time or frequency granularity may be determined for a frequency-time range of the data signal. The at least one of the second time or frequency granularity may be a subset of the at least one of the first time or frequency granularity. The method 200 may further include an act of detecting an availability of the data signal in the receive signal and an act of determining the second set of base metrics only when the availability of the data signal is detected.

The method 200 may further include an act of using regression, e.g. linear, piecewise-linear or non-linear regression, or curve fitting to determine the second mapping of the base metric to mutual information. The second mapping of the base metric to mutual information may include a monotonic mapping curve. The determining of the second mapping of the base metric to mutual information may further be based on a default mapping or a previous mapping of the base metric to mutual information. The method 200 may further include an act of using the default mapping or the previous mapping in cases where a set of input pairs of the base metric and the mutual information provide insufficient representation of parts of a predetermined mapping range. The updating of the first mapping may include an act of replacing the first mapping by the second mapping. The base metric of the composite receive signal may include a post-detection (post-equalization) signal to interference and noise ratio (SINR) determined from a channel matrix estimated from the reference signal.

The method 200 addresses the problem of estimating the mutual information (MI) between the input and output of a communication channel. Specifically, the method 200 provides a framework for data-aided adaptive MI estimation, whereby received data, when available, may be used to enhance MI estimates based on non-data reference signals.

The estimate of mutual information between the transmitted signal (input) and received signal (output) of a communication link, based on limited observations at the receiver, can represent the channel quality or the corresponding reception performance. As such, MI estimates are widely used for a variety of applications. One such application is link monitoring, whereby MI estimates are used to help the receiver decide in choosing appropriate transmitter to connect with. Another application is link adaptation, whereby MI estimates are used to derive signal parameters such as preferred rank, pre-coding, modulation order, channel code rate, etc., that are fed back to the transmitter and are used to modify the transmit signal for more reliable communication. The method 200 can improve accuracy for both of these applications, link monitoring and link adaptation.

Using the method 200, a class of adaptive MI estimation based on reference signal and data signal may be constructed by introducing a base metric based on the reference signal that is mapped to MI.

The method 200 may be used for estimating the mutual information (MI) between the input and output of a communication channel, where received data, when available, is used to enhance the MI estimates. The method 200 may utilize a base metric based on received signal, such that the mapping between a base metric and the corresponding mutual information is adjusted based on MI estimates of received data signal.

Figure 3:
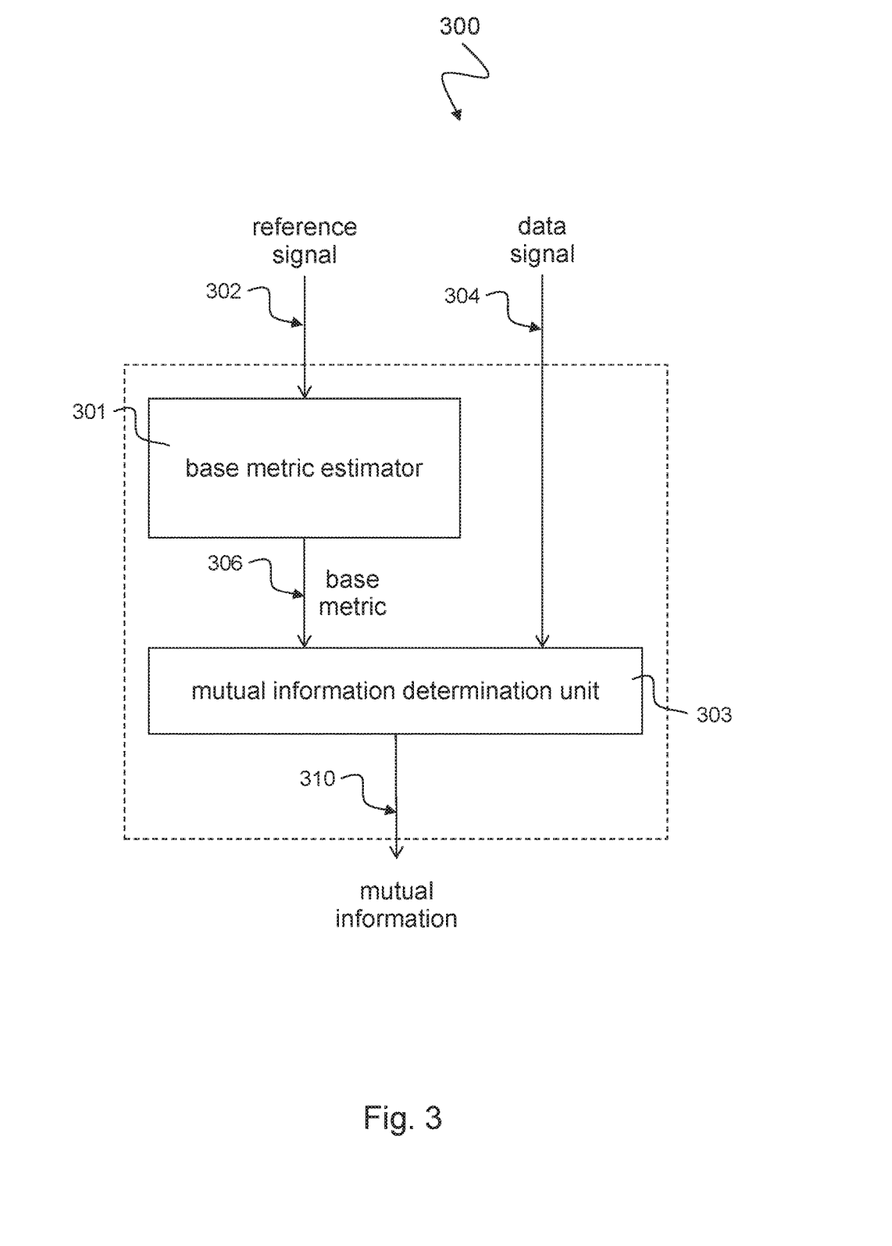
FIG. 3 is a schematic diagram of a device 300 in accordance with the disclosure for determining mutual information of a composite receive signal including a reference signal and a data signal.

FIG. 3 is a schematic diagram of a device 300 in accordance with the disclosure for determining mutual information of a composite receive signal including a reference signal and a data signal.

The device 300 includes a base metric estimator 301 configured to estimate a base metric 306 of the composite receive signal based on the reference signal 302. The base metric is indicative of a channel quality. The device 300 further includes a mutual information computation unit 303 configured to determine the mutual information 310 based on the base metric 306 and the data signal 304. Estimating the base metric 306 of the composite receive signal may correspond to the act of estimating the base metric 201 as described above with respect to FIG. 2. Determining the mutual information 310 based on the base metric 306 and the data signal 304 may correspond to the act of determining the mutual information 202 as described above with respect to FIG. 2.

The device 300 implements a data-aided adaptive MI estimation technique that utilizes data MI estimates to adjust the reference MI estimation framework, such that the reference MI estimates after the adjustment better reflect the actual channel and interference condition and/or reception performance of data. The device 300 provides robust MI estimation that adapts to the actual channel characteristics, interference conditions, and receiver types.

The device 300 may implement an apparatus for estimating the mutual information (MI) between the input and output of a communication channel, where received data, when available, is used to enhance the MI estimates. The device 300 may utilize a base metric based on received signal, such that the mapping between a base metric and the corresponding mutual information is adjusted based on MI estimates of received data signal.

Figure 4:
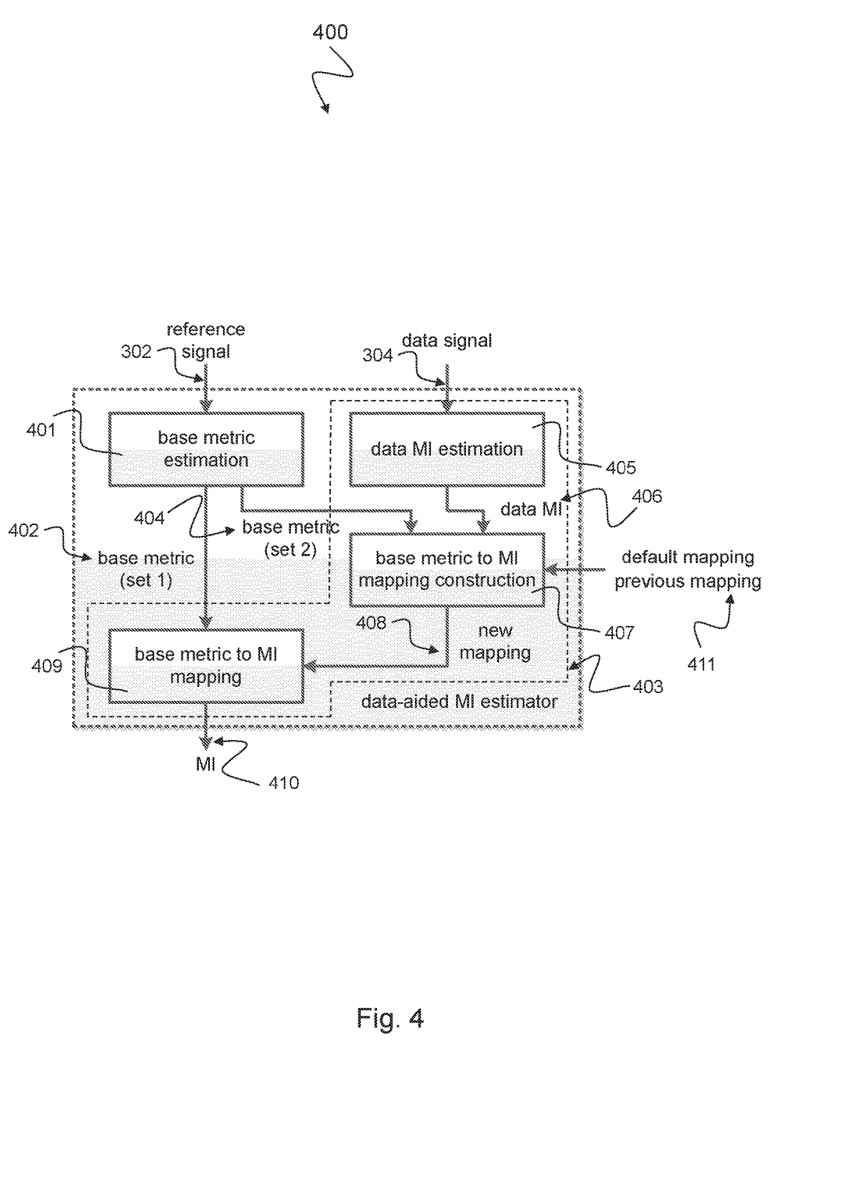
FIG. 4 is a schematic diagram of a device 400 in accordance with the disclosure for determining mutual information of a composite receive signal including a reference signal and a data signal.

FIG. 4 is a schematic diagram of a device 400 in accordance with the disclosure for determining mutual information of a composite receive signal including a reference signal and a data signal.

The device 400 includes a base metric estimator 401 configured to estimate a base metric 402, 404 of the composite receive signal based on the reference signal 302. The base metric is indicative of a channel quality. The device 400 further includes a mutual information computation unit 403 configured to determine the mutual information 410 based on the base metric 402, 404 and the data signal 304. Estimating the base metric 402, 404 of the composite receive signal may correspond to the act of estimating the base metric 201 as described above with respect to FIG. 2. Determining the mutual information 410 based on the base metric 402, 404 and the data signal 304 may correspond to the act of determining the mutual information 202 as described above with respect to FIG. 2. The base metric estimator 401 may correspond to the base metric estimator 301 as described above with respect to FIG. 3. The mutual information computation unit 403 may correspond to the mutual information computation unit 303 as described above with respect to FIG. 3.

The mutual information computation unit 403 may include a data-related mutual information estimator 405 that may estimate data-related mutual information 406 based on the data signal 304. The mutual information computation unit 403 may determine the mutual information 410 based on the base metric 402, 404 and the data-related mutual information 406.

The mutual information computation unit 403 may further include a mapping unit 409 that may determine the mutual information 410 by using a first mapping of the base metric 402 to mutual information 410. The mutual information computation unit 403 may further include a mapping construction unit 407 that may construct a second mapping 408 of the base metric 404 to data-related mutual information 406. The computation of the mutual information 410 may include updating the first mapping by using the second mapping 408.

The base metric estimator 401 may determine a first set of base metrics 402 for at least one of a first time or frequency granularity, e.g. the granularity defined for resource block (RB) samples or resource element (RE) samples in LTE. The mapping unit 409 may determine the mutual information 410 based on the first set of base metrics 402 and the first mapping. The base metric estimator 401 may determine a second set of base metrics 404 for at least one of a second time or frequency granularity that may be different from the at least one of the first time or frequency granularity. The mapping construction unit 407 may determine the second mapping based on the second set of base metrics 404 and the data-related mutual information 406.

The device 400 represents a data-aided adaptive MI estimator according to the disclosure. As FIG. 4 shows, the device 400 performing data-aided MI estimation may consist of base metric estimation 401, data MI estimation 405, base metric to MI mapping construction 407, and base metric to MI mapping 409 functionalities.

The base metric estimation block 401 may estimate base metrics based on reference signals. One set of base metrics, denoted as set 1 with reference sign 402 in FIG. 4, may be determined for the frequency-time range and granularity needed by the application. Another set of base metrics, denoted as set 2 with reference sign 404 in FIG. 4, may be determined for the same frequency-time range and granularity as the data MI. The set 2 may be a subset of set 1 or may be derived from set 1.

A widely used base metric that captures reception performance is the post-detection SINR. The post-detection SINR expression depends on the transmission scheme of the communication system and the detector used. For example, the post-detection SINR of MMSE detector for l-th layer in MIMO spatial multiplexing (SM) system, given a channel matrix H estimated from an observation of reference signals, can be represented as $$\gamma_{l,MMSE} = \frac{h_l^H (HH^H + \sigma_l^2 I)^{-1} h_l}{1 - h_l^H (HH^H + \sigma_l^2 I)^{-1} h_l} \quad (1)$$

where $h_l$ denotes l-th column vector of H, I denotes identity matrix, $\sigma_l^2$ is l-th layer noise-variance of received signal, and the notation $A^H$ denotes conjugate transpose of the matrix A. The base metric estimator 401 of the device 400 may use the post-detection SINR according to equation (1) to estimate the base metric.

The data MI estimation block 405 may estimate data MI 406 when data signals are available. The mutual information between transmitted bits X and log-likelihood ratio (LLR) Y of received signal may be defined as $$I(X;Y) = I(Y;X) = \sum_x p(x) \sum_y p(y|x) \log_2\left(\frac{p(y|x)}{p(y)}\right) \quad (2)$$

which may be approximated by replacing probability distribution functions $p(\cdot)$ with histograms.

Computationally efficient methods for estimating the mutual information, without determining histograms, are available. The Hagenauer metric requires the LLR and the sign of the transmitted bits X, and can be represented as $$I_H(X;Y) = 1 - \frac{1}{N_Y} \sum_k \log_2(1 + e^{(-x_k \cdot y_k)}) \quad (3)$$

where $N_Y$ denotes the number of LLR samples, which is the same as the number of transmitted bits considered. Even more efficient model in the form of Land metric utilizes only the absolute value of the LLR, and can be represented as $$I_L(X;Y) = \frac{1}{N_Y} \sum_k f_l(|y_k|) \quad (4a)$$

where $$f_l(y_k) = \frac{1}{1+e^{+y}} \log_2\left(\frac{2}{1+e^{+y}}\right) + \frac{1}{1+e^{-y}} \log_2\left(\frac{2}{1+e^{-y}}\right) \quad (4b)$$

These Hagenauer and Land metrics assume ideal log-MAP (maximum a posteriori) detection, thus in practical applications may exhibit bias.

The data MI estimation block 405 may estimate data MI based on the mutual information according to equation (2). The data MI estimation block 405 may estimate data MI based on the Hagenauer metric according to equation (3) or the Land metric according to equations (4a) and (4b).

The base metric to MI mapping construction block 407 may construct new base-metric-to-MI mappings 408 based on a set of input pairs of data MI 406 and base metric 404. Actual construction method may depend on the choice of base metric that may dictate its relationship to MI.

A desirable base metric may monotonically depend on channel quality or reception performance, and hence, its mapping to MI may be a monotonic curve. Thus this mapping construction functionality may include a curve-fitting process, employing some form of regression. The mapping construction functionality may additionally incorporate a default mapping or a previous mapping 411 as input. This may be necessary for the typical case where the set of input pairs of data MI 406 and base metric 404 does not span the whole range of mapping. In such a case, a default or previous mapping 411 may be used to determine the parts of mapping not spanned by the set of input pairs.

The base metric to MI mapping block 409 may map the base metric set 1 from the base metric estimation block 401 to corresponding set of MI values 410. When a new mapping 408 constructed by the base metric to MI mapping construction block 407 becomes available, the mapping used in this block 409 may be updated with the new mapping 408.

An example of the data-aided adaptive MI estimation in the context of 3GPP LTE (Long Term Evolution) systems is described below with respect to FIG. 5.

Figure 5:
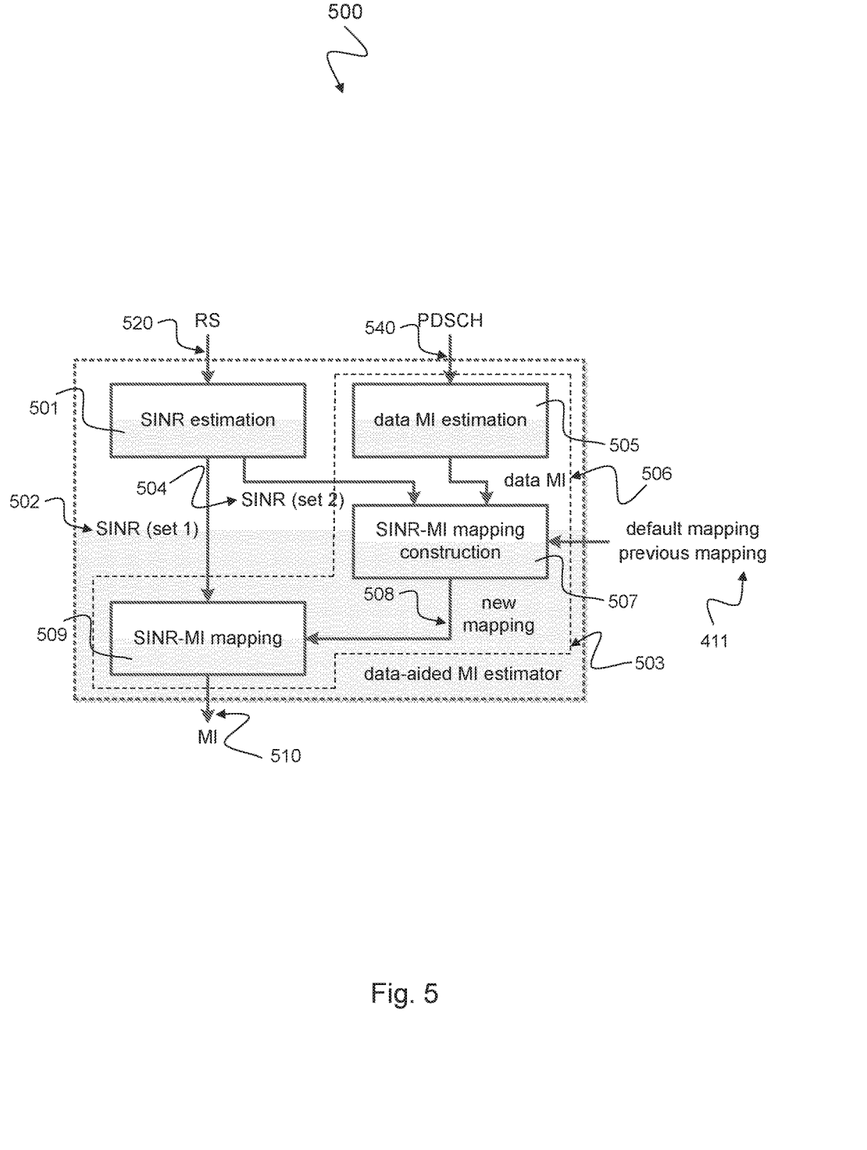
FIG. 5 is a schematic diagram of a radio receiver circuit 500 in accordance with the disclosure for receiving a composite receive signal including a reference signal and a data signal.

FIG. 5 is a schematic diagram of a radio receiver circuit 500 in accordance with the disclosure for receiving a composite receive signal including a reference signal 520 and a data signal 540, e.g. a PDSCH (physical downlink shared channel) signal according to LTE.

The radio receiver circuit 500 includes a base metric estimator 501, in this context referred to as SINR estimator, to estimate a first set of base metrics 502 with respect to at least one of a first time or frequency granularity, e.g. the granularity defined for resource block (RB) samples or resource element (RE) samples in LTE, based on the reference signal 520. The base metric estimator 501 estimates a second set of base metrics 504 with respect to at least one of a second time or frequency granularity based on the reference signal 520. The second granularity may be different from the first granularity. The radio receiver circuit 500 further includes a mapping unit 509, also referred to as SINR-MI mapping unit, to provide a first mapping of the base metric to mutual information 510 based on the first set of base metrics 502. The radio receiver circuit 500 includes a data-related mutual information estimator 505 to estimate a set of data-related mutual information 506 based on the data signal 540. The radio receiver circuit 500 further includes a mapping construction unit 507, also referred to as SINR-MI mapping construction unit, to determine a second mapping 508, also referred to as new mapping, of the base metric to mutual information based on the second set of base metrics 504 and the set of data-related mutual information 506. The mapping construction unit 507 updates the first mapping of the base metric 502, 504 to mutual information 510 with the second mapping 508 of the base metric 502, 504 to data-related mutual information 506. The mapping unit 509 estimates mutual information 510 based on the first set of base metrics 502 and the updated first mapping of the base metric 502, 504 to mutual information 510.

The base metric estimator 501 may correspond to the base metric estimator 401 as described above with respect to FIG. 4. The mapping unit 509 may correspond to the mapping unit 409 as described above with respect to FIG. 4. The mapping construction unit 507 may correspond to the mapping construction unit 407 as described above with respect to FIG. 4. The data-related mutual information estimator 505 may correspond to the data-related mutual information estimator 405 as described above with respect to FIG. 4.

The data-related mutual information estimator 505 may estimate the set of data-related mutual information 506 based on one of a Hagenauer metric, a Land metric and a histogram-based metric as shown above with respect to equations (2), (3), (4a) and (4b).

The device 500 represents a data-aided adaptive MI estimator that may be used in LTE systems. As FIG. 5 shows, in this example, the post-detection SINR γ may be chosen as the base metric. The SINR estimation block 501 may determine set 1 with reference sign 502 and set 2 with reference sign 504 of γ, which may depend on the type of detector. Set 1 may span the whole band in frequency and a sub-frame in time, with a granularity of one or more samples per resource block (RB). Set 2 may be determined only when PDSCH is available at the receiver, and may span the subbands occupied by the received PDSCH, e.g. with a granularity of one sample per RB. This set 2 may be derived from the set 1.

The data MI estimation block 505 may employ the Hagenauer metric $I_H(X;Y)$ or the Land metric $I_L(X;Y)$ to produce one data-MI estimate per RB. A data MI and a γ corresponding to the same RB form an input pair, the set of which may be sent to the SINR-MI mapping construction block 507. The SINR-MI mapping construction block 507 may employ regression algorithms to construct SINR-MI mapping curves. For instance, if the SINR-MI mapping framework is implemented in piecewise-linear mapping, then this block may employ piecewise-linear (or segmented linear) regression algorithms. There may be one mapping curve for each modulation order, but the mappings may be independent of rank and pre-coding. For the segments of a mapping that are not covered by the set of input pairs, the corresponding segments of a default mapping or a previous mapping may be recycled.

The SINR-MI mapping block 509 may map γ to MI. When PDSCH is available, the mappings used in this block may be updated with the new mappings 508 from the SINR-MI mapping construction block 507.

The device 500 utilizes a base metric, whose relationship to reference MI estimate may be adjusted based on data MI estimate, where the base metric is based on observations of received signal and captures the associated channel quality or reception performance.

Specifically, a set of data MIs may be estimated, along with a base metric for each of the data MI estimate samples, thereby forming a set of pairs of a data MI and a base metric. A mapping between base metric and data MI may be deduced from these pairs, and this mapping may be integrated with the existing mapping from base metric to reference MI to form a new mapping.

The device 500 is superior to a straightforward data-aided solution where reference MI is simply replaced or averaged with data MI, in the sense that the effect of adjustment not only stays in time but also covers larger signal parameter space than those of the observation (data and reference) signals. This distinction is of particular importance in link adaptation applications, which may require a large number of candidate MI values belonging to distinct combinations of signal parameters (e.g. rank, pre-coding, modulation order, etc.). A straightforward replacement or averaging scheme can update only the reference MI corresponding to the same signal parameter condition as the received data. Moreover, such a scheme does not lend itself well to adaptation in time-varying channels; an increment or decrement for a given reference MI is in general not valid for other reference MI values.

On the other hand, as an illustration, the mapping between an example base metric of post-detection SINR and MI may depend only on modulation order and not on rank and pre-coding. Thus an update of the post-detection SINR to MI mapping may affect all MIs that have the same modulation order as the observation data, regardless of rank and pre-coding. Furthermore, such a mapping may be invariant to instantaneous channel realization as long as the statistical channel properties remain the same. Thus the device 500 can provide benefits even with occasional or sporadic data transmission. Herein, the term SINR is used interchangeably with post-detection SINR.

Figure 6:
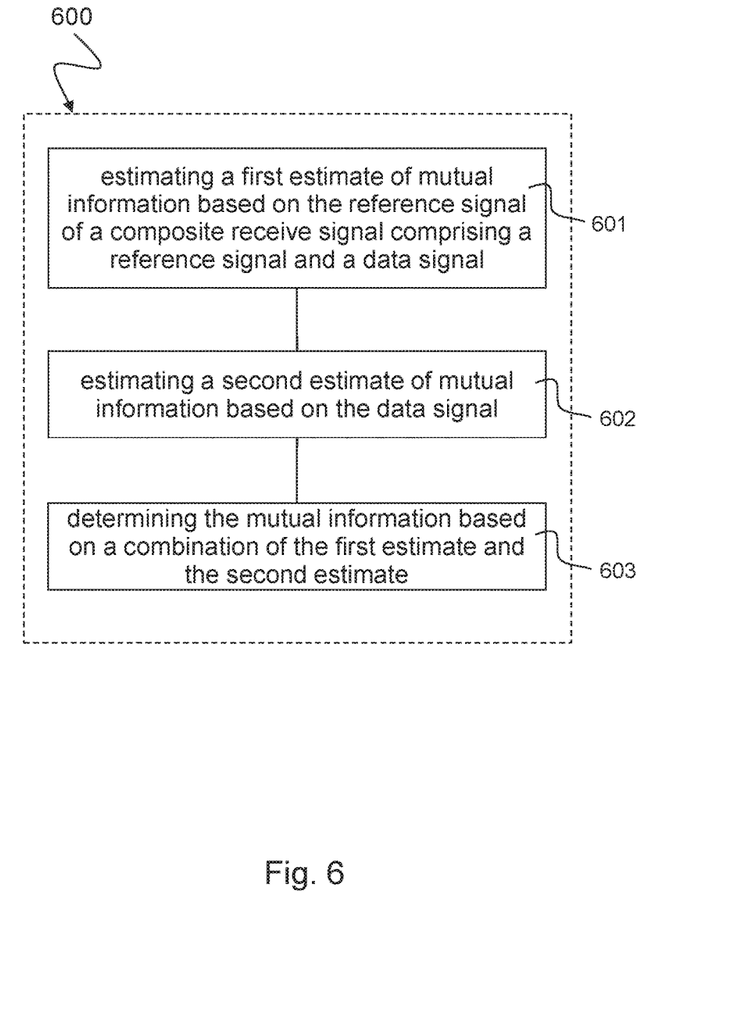
FIG. 6 is a schematic diagram of a method 600 in accordance with the disclosure for determining mutual information between an input and an output of a communication channel based on a composite receive signal including a reference signal and a data signal.

FIG. 6 is a schematic diagram of a method 600 in accordance with the disclosure for determining mutual information between an input and an output of a communication channel based on a composite receive signal including a reference signal and a data signal.

The method 600 includes an act of estimating 601 a first estimate of the mutual information based on the reference signal. The method 600 includes an act of estimating 602 a second estimate of the mutual information based on the data signal. The method 600 includes an act of determining 603 the mutual information based on a combination of the first estimate and the second estimate.

The method 600 may include an act of determining the mutual information based on the combination of the first estimate and the second estimate when the data signal is available and an act of determining the mutual information based on the first estimate when the data signal is not available. Estimation of the mutual information may be performed as described above with respect to FIGS. 2 to 5.

EXAMPLES

The following examples pertain to further embodiments. Example 1 is a method of determining mutual information of a composite receive signal, the composite receive signal comprising a reference signal and a data signal, the method comprising: estimating a base metric of the composite receive signal based on the reference signal, the base metric being indicative of a channel quality; and determining (202) the mutual information based on the base metric and the data signal.

In Example 2, the subject matter of Example 1 can optionally include estimating data-related mutual information based on the data signal; and determining the mutual information based on the base metric and the data-related mutual information.

In Example 3, the subject matter of Example 2 can optionally include determining a first mapping of the base metric to mutual information based on the reference signal; and determining the mutual information by adjusting the first mapping based on the data-related mutual information.

In Example 4, the subject matter of Example 3 can optionally include determining a second mapping of the base metric to data-related mutual information; and wherein adjusting the first mapping comprises updating the first mapping by using the second mapping.

In Example 5, the subject matter of any one of Examples 3-4 can optionally include determining a first set of base metrics for at least one of a first time or frequency granularity based on the reference signal; and determining the first mapping of the base metric to mutual information based on the first set of base metrics.

In Example 6, the subject matter of any one of Examples 4-5 can optionally include determining a second set of base metrics for at least one of a second time or frequency granularity based on the reference signal; and determining the second mapping of the base metric to data-related mutual information based on the second set of base metrics.

In Example 7, the subject matter of Example 6 can optionally include that the at least one of the second time or frequency granularity is determined for a frequency-time range of the data signal.

In Example 8, the subject matter of any one of Examples 6-7 can optionally include that the at least one of the second time or frequency granularity is a subset of the at least one of the first time or frequency granularity.

In Example 9, the subject matter of any one of Examples 6-8 can optionally include detecting an availability of the data signal in the receive signal; and determining the second set of base metrics when the availability of the data signal is detected.

In Example 10, the subject matter of any one of Examples 4-9 can optionally include using regression analysis or curve fitting to determine the second mapping of the base metric to mutual information.

In Example 11, the subject matter of any one of Examples 4-10 can optionally include that the second mapping of the base metric to mutual information comprises a monotonic mapping curve.

In Example 12, the subject matter of any one of Examples 4-11 can optionally include that the determining of the second mapping of the base metric to mutual information is further based on a default mapping or a previous mapping of the base metric to mutual information.

In Example 13, the subject matter of Example 12 can optionally include using the default mapping or the previous mapping when a set of input pairs of the base metric and the mutual information provide insufficient representations of parts of a predetermined mapping range.

In Example 14, the subject matter of any one of Examples 4-13 can optionally include that updating of the first mapping comprises replacing the first mapping by the second mapping.

In Example 15, the subject matter of any one of Examples 1-14 can optionally include that the base metric of the composite receive signal comprises a post-detection SINR determined from a channel matrix estimated from the reference signal.

Example 16 is a device for determining mutual information of a composite receive signal comprising a reference signal and a data signal, the device comprising: a base metric estimator configured to estimate a base metric of the composite receive signal based on the reference signal, the base metric being indicative of a channel quality; and a mutual information determination unit configured to determine the mutual information (310) based on the base metric and the data signal.

In Example 17, the subject matter of Example 16 can optionally include that the mutual information determination unit comprises: a data-related mutual information estimator configured to estimate data-related mutual information based on the data signal, whereby the mutual information determination unit is configured to determine the mutual information based on the base metric and the data-related mutual information.

In Example 18, the subject matter of Example 17 can optionally include that the mutual information determination unit further comprises: a mapping unit configured to determine the mutual information by using a first mapping of the base metric to mutual information.

In Example 19, the subject matter of Example 18 can optionally include that the mutual information determination unit further comprises: a mapping construction unit configured to construct a second mapping of the base metric to data-related mutual information, and that the determination of the mutual information comprises updating the first mapping by using the second mapping.

In Example 20, the subject matter of any one of Examples 17-19 can optionally include that the base metric estimator is configured to determine a first set of base metrics for at least one of a first time or frequency granularity, and that the mapping unit is configured to determine the mutual information based on the first set of base metrics and the first mapping.

In Example 21, the subject matter of any one of Examples 17-20 can optionally include that the base metric estimator is configured to determine a second set of base metrics for at least one of a second time or frequency granularity different from the at least one of the first time or frequency granularity, and that the mapping construction unit is configured to determine the second mapping based on the second set of base metrics and the data-related mutual information.

Example 22 is a radio receiver circuit for receiving a composite receive signal comprising a reference signal (520) and a data signal, the radio receiver circuit comprising: a base metric estimator configured to estimate a first set of base metrics with respect to at least one of a first time or frequency granularity based on the reference signal and to estimate a second set of base metrics with respect to at least one of a second time or frequency granularity based on the reference signal; a mapping unit configured to provide a first mapping of the base metric to mutual information based on the first set of base metrics; a data-related mutual information estimator configured to estimate a set of data-related mutual information based on the data signal; and a mapping construction unit configured to determine a second mapping of the base metric to mutual information based on the second set of base metrics and the set of data-related mutual information and to update the first mapping of the base metric to mutual information with the second mapping of the base metric to data-related mutual information, wherein the mapping unit is configured to estimate mutual information based on the first set of base metrics and the updated first mapping of the base metric to mutual information.

In Example 23, the subject matter of Example 22 can optionally include that the data-related mutual information estimator is configured to estimate the set of data-related mutual information based on one of a Hagenauer metric, a Land metric and a histogram-based metric.

Example 24 is a method for determining mutual information between an input and an output of a communication channel based on a composite receive signal comprising a reference signal and a data signal, the method comprising: estimating a first estimate of the mutual information based on the reference signal; estimating a second estimate of the mutual information based on the data signal; and determining the mutual information based on a combination of the first estimate and the second estimate.

In Example 25, the subject matter of Example 24 can optionally include determining the mutual information based on the combination of the first estimate and the second estimate when the data signal is available; and determining the mutual information based on the first estimate when the data signal is not available.

Example 26 is a computer readable medium on which computer instructions are stored which when executed by a computer, cause the computer to perform the method of one of Examples 1 to 15.

Example 27 is a device for determining mutual information of a composite receive signal, the composite receive signal comprising a reference signal and a data signal, the device comprising: estimating means for estimating a base metric of the composite receive signal based on the reference signal, the base metric being indicative of a channel quality; and determining means for determining the mutual information based on the base metric and the data signal.

In Example 28, the subject matter of Example 27 can optionally include second estimating means for estimating data-related mutual information based on the data signal; and that the determining means is configured to determine the mutual information based on the base metric and the data-related mutual information.

In Example 29, the subject matter of Example 28 can optionally include determining means for determining a first mapping of the base metric to mutual information based on the reference signal; and that the determining means is configured to determine the mutual information by adjusting the first mapping based on the data-related mutual information.

In Example 30, the subject matter of Example 29 can optionally include second determining means for determining a second mapping of the base metric to data-related mutual information; and that the determining means is configured to adjust the first mapping by updating the first mapping using the second mapping.

Example 31 is a transmission system comprising a base station and a mobile station, wherein the base station is configured to transmit a composite transmit signal comprising a reference signal and a data signal, and wherein the mobile station is configured to receive a composite receive signal comprising a reference signal and a data signal responsive to the transmission of the base station, the mobile station comprising a device for determining mutual information according to one of Examples 16 to 21.

In Example 32, the subject matter of Example 31 can optionally include that the mobile station is configured to transmit representations of the mutual information to the base station, in particular metrics like CQI, PMI and/or RI that may be derived from a set of mutual information values; and that the base station comprises an adjustable transmit antenna and a control unit configured to control adjusting the transmit antenna based on the representations of the mutual information received from the mobile station.

Example 33 is a transmission system comprising a first base station transmitting a first composite transmit signal comprising a reference signal and a data signal; a second base station transmitting a second composite transmit signal comprising a reference signal and a data signal; and a mobile station receiving a first composite receive signal responsive to the transmission of the first base station and receiving a second composite receive signal responsive to the transmission of the second base station, wherein the mobile station comprises a device for determining first mutual information for the first composite receive signal and determining second mutual information for the second composite receive signal according to one of Examples 16 to 21.

In Example 34, the subject matter of Example 33 can optionally include that the mobile station comprises a link monitor configured to monitor a quality of a first link to the first base station based on the first mutual information and a quality of a second link to the second base station based on the second mutual information.

In Example 35, the subject matter of Example 34 can optionally include that the mobile station comprises a link connector configured to connect the mobile station to the first base station if a quality of the first link is better than a quality of the second link and to connect the mobile station to the second base station if a quality of the second link is better than a quality of the first link.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the concept of the present disclosure. This application is intended to cover any adaptations or variations of the specific aspects discussed herein.

What is claimed is:

1. A method of determining mutual information of a composite receive signal, the composite receive signal comprising a reference signal and a data signal, the method comprising:
receiving, by a wireless communication device, the composite receive signal via a wireless communication link;
estimating, by the wireless communication device, a base metric of the composite receive signal based on the reference signal, the base metric being indicative of a channel quality associated with the wireless communication link;
determining, by the wireless communication device, the mutual information based on the base metric and the data signal; and
performing link monitoring, by the wireless communication device, of the wireless communication link using the mutual information.

2. The method of claim 1, further comprising:
estimating data-related mutual information based on the data signal; and
determining the mutual information based on the base metric and the data-related mutual information.

3. The method of claim 2, further comprising:
determining a first mapping of the base metric to mutual information based on the reference signal; and
determining the mutual information by adjusting the first mapping based on the data-related mutual information.

4. The method of claim 3, further comprising:
determining a second mapping of the base metric to data-related mutual information, wherein adjusting the first mapping comprises updating the first mapping by using the second mapping.

5. The method of claim 3, further comprising:
determining a first set of base metrics for at least one of a first time or frequency granularity based on the reference signal; and
determining the first mapping of the base metric to mutual information based on the first set of base metrics.

6. The method of claim 4, further comprising:
determining a second set of base metrics for at least one of a second time or frequency granularity based on the reference signal; and
determining the second mapping of the base metric to data-related mutual information based on the second set of base metrics.

7. The method of claim 6, wherein the at least one of the second time or frequency granularity is determined for a frequency-time range of the data signal.

8. The method of claim 6, wherein the at least one of the second time or frequency granularity is a subset of the at least one of the first time or frequency granularity.

9. The method of claim 6, further comprising:
detecting an availability of the data signal in the composite receive signal; and
determining the second set of base metrics when the availability of the data signal is detected.

10. The method of claim 4, further comprising:
using regression analysis or curve fitting to determine the second mapping of the base metric to the mutual information.

11. The method of claim 4, wherein the second mapping of the base metric to the mutual information comprises a monotonic mapping curve.

12. The method of claim 4, wherein the determining of the second mapping of the base metric to the mutual information is further based on a default mapping or a previous mapping of the base metric to mutual information.

13. The method of claim 12, further comprising:
using the default mapping or the previous mapping when a set of input pairs of the base metric and the mutual information provide insufficient representation of parts of a predetermined mapping range.

14. The method of claim 4, wherein updating of the first mapping comprises replacing the first mapping by the second mapping.

15. The method of claim 1, wherein the base metric of the composite receive signal comprises a post-detection Signal to Interference and Noise Ratio (SINR) determined from a channel matrix estimated from the reference signal.

16. The method of claim 1, further comprising,
providing, by the wireless communication device, the mutual information to a transmitter from which the composite receive signal was received,
wherein the transmitter uses the mutual information to adapt the wireless link.

17. A device for determining mutual information of a composite receive signal received by the device via a wireless communication link, the composite receive signal comprising a reference signal and a data signal, the device comprising:
a base metric estimator configured to estimate a base metric of the composite receive signal based on the reference signal, the base metric being indicative of a channel quality; and
a mutual information determiner configured to determine the mutual information based on the base metric and the data signal,
wherein the device uses the mutual information to perform link monitoring of the wireless communication link.

18. The device of claim 17, wherein the mutual information determination unit comprises:
a data-related mutual information estimator configured to estimate data-related mutual information based on the data signal, wherein the mutual information determiner is configured to determine the mutual information based on the base metric and the data-related mutual information.

19. The device of claim 18, wherein the mutual information determiner further comprises:
a mapper configured to determine the mutual information by using a first mapping of the base metric to mutual information.

20. The device of claim 19, wherein the mutual information determiner further comprises:

a mapping constructor configured to construct a second mapping of the base metric to data-related mutual information, and wherein the determination of the mutual information comprises updating the first mapping by using the second mapping.

21. The device of claim 19, wherein the base metric estimator is configured to determine a first set of base metrics for at least one of a first time or frequency granularity, and wherein the mapper is configured to determine the mutual information based on the first set of base metrics and the first mapping.

22. The device of claim 20, wherein the base metric estimator is configured to determine a second set of base metrics for at least one of a second time or frequency granularity different from the at least one of the first time or frequency granularity, and wherein the mapping constructor is configured to determine the second mapping based on the second set of base metrics and the data-related mutual information.

23. A radio receiver for receiving a composite receive signal via a wireless communication link, the composite receive signal comprising a reference signal and a data signal, the radio receiver comprising:

a base metric estimator configured to estimate a first set of base metrics with respect to at least one of a first time or frequency granularity based on the reference signal and to estimate a second set of base metrics with respect to at least one of a second time or frequency granularity based on the reference signal;

a mapper configured to provide a first mapping of the base metric to mutual information based on the first set of base metrics;

a data-related mutual information estimator configured to estimate a set of data-related mutual information based on the data signal; and a mapping constructor configured to determine a second mapping of the base metric to mutual information based on the second set of base metrics and the set of data-related mutual information, and to update the first mapping of the base metric to mutual information with the second mapping of the base metric to data-related mutual information, wherein the mapper is configured to estimate mutual information based on the first set of base metrics and the updated first mapping of the base metric to mutual information, and wherein the radio receiver uses the mutual information to perform link monitoring of the wireless communication link.

24. The radio receiver of claim 23, wherein the data-related mutual information estimator is configured to estimate the set of data-related mutual information based on one of a Hagenauer metric, a Land metric, and a histogram-based metric.

25. A method for determining mutual information between an input and an output of a communication channel based on a composite receive signal comprising a reference signal and a data signal, the method comprising:

calculating, via the receiver, a first estimate of the mutual information based on the reference signal;

calculating, via the receiver, a second estimate of the mutual information based on the data signal;

determining, via the receiver, the mutual information based on a combination of the first estimate and the second estimate; and performing link monitoring, by the receiver, of the communication channel using the mutual information.

26. The method of claim 25, comprising:

determining the mutual information based on the combination of the first estimate and the second estimate when the data signal is available; and determining the mutual information based on the first estimate when the data signal is not available.

* * * * *